United States Patent [19]

Ebeling

[11] Patent Number: 5,536,303
[45] Date of Patent: Jul. 16, 1996

[54] METHOD OF LOW TEMPERATURE REGENERATION OF GLYCOL USED FOR DEHYDRATING NATURAL GAS

[76] Inventor: Harold O. Ebeling, 4718 S. Lewis Ct., Tulsa, Okla. 74105

[21] Appl. No.: 488,688

[22] Filed: Jun. 8, 1995

Related U.S. Application Data

[63] Continuation-in-part of Ser. No. 263,761, Jun. 22, 1994, Pat. No. 5,453,114.

[51] Int. Cl.$^6$ ............................ B01D 53/14; B01D 47/00
[52] U.S. Cl. ................... 95/166; 95/169; 95/179; 95/191; 95/194; 95/227; 95/231; 95/237
[58] Field of Search ........................... 95/159, 165, 166, 95/169, 178, 179, 186, 187, 191–194, 204, 211, 227, 231

[56] References Cited

U.S. PATENT DOCUMENTS

| | | | |
|---|---|---|---|
| 2,757,754 | 8/1956 | Natta | 95/166 X |
| 2,812,827 | 11/1957 | Worley et al. | 95/194 |
| 3,105,748 | 10/1963 | Stahl | 95/191 |
| 3,616,598 | 11/1971 | Foral, Jr. | 95/191 X |
| 3,824,177 | 7/1974 | Honerkamp et al. | 95/194 X |
| 3,867,112 | 2/1975 | Honerkamp et al. | 95/191 X |
| 4,010,065 | 3/1977 | Alleman | 95/169 X |
| 4,280,867 | 7/1981 | Hodgson | 95/191 X |
| 4,375,977 | 3/1983 | Honerkamp et al. | 55/234 |
| 4,529,413 | 7/1985 | Ferguson | 95/166 |
| 4,659,344 | 4/1987 | Gerlach et al. | 95/231 |
| 4,661,130 | 4/1987 | Ebeling et al. | 55/234 |
| 4,674,446 | 6/1987 | Padilla, Sr. | 95/194 X |
| 4,689,053 | 8/1987 | Heath | 95/194 X |
| 5,084,074 | 1/1992 | Beer et al. | 95/193 X |
| 5,116,393 | 5/1992 | Ebeling | 55/229 |
| 5,163,981 | 11/1992 | Choi | 55/32 |
| 5,209,762 | 5/1993 | Lowell | 95/193 X |
| 5,453,114 | 9/1995 | Ebeling | 95/166 |

*Primary Examiner*—Robert Spitzer
*Attorney, Agent, or Firm*—Head, Johnson & Kachigian

[57] ABSTRACT

A method of low temperature regeneration of glycol used for dehydrating natural gas in a glycol dehydration system including the steps of passing natural gas against flowing glycol in an absorber vessel so that the glycol absorbs water from the gas, providing spent glycol and dehydrated gas, conducting the spent glycol into a reboiler vessel, feeding a portion of the dehydrated gas into a burner positioned within the reboiler vessel where the dehydrated gas is combusted to heat the spent glycol, conducting a first portion of dehydrated gas into a gas distributor located within a lower portion of the reboiler vessel, the gas distributor causing small bubbles of gas to move upwardly through the spent glycol within the reboiler to augment separation of water from the heated glycol, conducting a second portion of the dehydrated gas into an upper gas stripper vessel mounted within an upper portion of the reboiler vessel to contact the dehydrated gas with the spent glycol to further augment the separation of water from the glycol to provide dehydrated glycol followed by withdrawing the dehydrated glycol and passing the water vapor that has been removed from the spent glycol to the atmosphere, the dehydrated gas serving to gently but thoroughly agitate the heated spent glycol to augment the separation of water, thereby permitting the spent glycol to be thoroughly dehydrated without the glycol reaching its boiling point, thereby reducing evaporation of the glycol in the regeneration process.

8 Claims, 8 Drawing Sheets

METHOD OF LOW TEMPERATURE REGENERATION OF GLYCOL USED FOR DEHYDRATING NATURAL GAS

REFERENCE TO PENDING APPLICATIONS

This application is a continuation-in-part of U.S. patent application Ser. No. 08/263,761 entitled "A Method of Dehydrating Natural Gas For Reducing Emissions Of Hydrocarbon Impurities", filed Jun. 22, 1994, now U.S. Pat. No. 5,453,114.

CROSS-REFERENCE TO MICROFICHE APPENDIX

This application is not related to any microfiche appendix.

BACKGROUND OF THE INVENTION

Natural gas flowing from wells typically contain water vapor along with entrained liquids, such as water droplets and oil droplets. These entrained elements, and particularly entrained water, can cause many problems in pipeline and processing equipment. For this reason, it has long been a common practice to treat the natural gas at or near the well head to remove these materials from the gas before it is passed into a pipeline. Removing water vapor and other impurities helps to prevent clogging of a pipeline with liquid water or liquid hydrocarbons which frequently separate out of gas as it passes through a pipeline due to the lower temperatures existing in the pipeline compared to the temperatures of which the gas naturally exists in the earth. Further, removal of water impurities helps prevent formation of hydrates which can clog a pipeline system. Finally, an important reason for removing water vapor and other contaminates is to prevent corrosion of pipelines, tanks and other components of transportation and processing systems.

Processes for removal of entrained water vapor and other contaminants in natural gas are well known. The most commonly used process employs glycol dehydration. Before treating a gas for glycol dehydration, it is typically passed into a separator where water droplets, along with droplets of hydrocarbon liquids, entrained sand, rust and so forth is separated from the gas stream. Condensable hydrocarbons and water are generally removed by expanding the high pressure gas from a well so that the resultant temperature drop causes condensation of the condensables.

Subsequent dehydration of the gas is most commonly achieved by contacting it with a desiccant liquid that readily absorbs water. The most commonly used desiccant is glycol either in the form of diethylene glycol or triethylene glycol. Water vapor entrained within the gas stream is absorbed by the glycol desiccant, and the desiccant is then regenerated by heating it to drive off the absorbed water. After the desiccant has been heated to regenerate, it is then recycled for use in the dehydration system. Usually, the heat required for regeneration of the liquid desiccant is obtained by burning a portion of the natural gas.

For background information relating to glycol dehydrator systems for treating natural gas, reference may be had to U.S. Pat. Nos. 5,163,981; 5,116,393; 4,375,977 and 4,661,130.

One problem that has existed with glycol dehydrators is that when spent glycol is heated to drive off the entrained water that has been extracted from natural gas, frequently, along with the vapor that is driven off, some aromatic hydrocarbons are also passed into the atmosphere. These aromatic hydrocarbons are considered pollutants. They include benzene, toluene, ethylene and xylene, sometimes referred to in the trade as BTEX. They are environmentally hazardous and are considered carcinogens. These and other deleterious hydrocarbons that can be generated in the process of dehydrating natural gas are collectively referred to as volatile organic compounds, sometimes shortened to VOC's.

BRIEF SUMMARY OF THE INVENTION

An improved method of dehydrating natural gas is provided in which emissions of impurities, including volatile organic compounds (VOC's) into the atmosphere is substantially reduced. Natural gas is first, after passage through a separator in which entrained liquid components are gravitationally separated, passed into an absorber. In the absorber, the natural gas passes upwardly against downwardly flowing liquid desiccant. The liquid desiccant absorbs water along with hydrocarbon impurities forming a spent desiccant. The spent desiccant is withdrawn from the absorber and the temperature thereof is raised to a level of desiccant regeneration, that is, a level at which entrained water and hydrocarbon aromatics, including VOC's, are vaporized and driven off while the desiccant itself remains liquid.

Treated gas is withdrawn from the absorber and a portion of it is heated and then passed upwardly through a desiccant stripper vessel. The balance of the treated gas is passed on to distribution. Heated spent desiccant is passed downwardly through the desiccant stripper vessel to purge the desiccant of VOC's and water vapor that are carried out in the upwardly flowing gas stream. The spent desiccant from the stripper vessel is conveyed to a reboiler and the gas from the stripper vessel is conveyed to a burner in the reboiler where the gas is combusted with air to heat the spent desiccant in the reboiler to boil off entrained water into a vapor and to provide a regenerated desiccant that is fed back to the absorber. Thus, a system is provided wherein the liquid desiccant employed in the absorber is continually recycled. The vapor that is boiled off of the spent desiccant in the reboiler is substantially only water vapor that is passed into the atmosphere. The hydrocarbon impurities are absorbed in the upwardly flowing gas stream in the glycol stripper and are consumed in the burner and are prevented from entering into the atmosphere.

It is thus an object of this invention to provide a method for treating natural gas to remove entrained water and hydrocarbons including entrained aromatics, and to prevent the discharge of VOC's into the atmosphere.

In one embodiment, the liquid desiccant is recycled using an electric motor driven pump. In another embodiment, the liquid desiccant is recirculated using a glycol/gas powered pump. The latter embodiment is particularly useful in locations where electrical energy is not economically available.

It has been further discovered that the emission of contaminants into the atmosphere in the process of dehydrating natural gas can be substantially reduced by the method of this invention in which a low temperature is required for regenerating glycol. The natural gas to be dehydrated is passed against flowing glycol in an absorber vessel so that the glycol absorbs the water from the gas providing spent glycol and dehydrated gas. The spent glycol is withdrawn and passed into a reboiler vessel. A portion of the dehydrated gas is fed to a burner positioned within the reboiler vessel where the dehydrated gas is combusted in the burner to heat the spent glycol. A first portion of the dehydrated gas is also fed into a gas distributor located within a lower portion of the reboiler. The gas distributor causes small bubbles of gas to move upwardly through the spent glycol within the reboiler to augment the separation of water from the spent glycol. The bubbles of gas moving in the glycol results in the separation of water at a temperature lower than the boiling point of the glycol to thereby provide regenerated glycol.

A second portion of the dehydrated gas is fed into an upper gas stripper vessel mounted within the upper portion of the reboiler vessel to contact the dehydrated gas with the spent glycol to further augment the separation of water from the spent glycol after which the regenerated glycol from the reboiler is withdrawn and returned to an absorber vessel for contact with natural gas as the cycle is repeated. Thus, in practices of this invention, dehydrated gas is bubbled through the spent glycol in the regenerator in two different environments. First, in the main body of the glycol regenerator and second, within a confined area formed by an upper gas stripper vessel mounted within the upper portion of the reboiler vessel to vigorously agitate the glycol as it is heated in the reboiler so that water vapor is passed out of the glycol at a lower temperature and specifically, at a temperature that is below the boiling point of the glycol to thereby reduce evaporated glycol into the atmosphere.

A better understanding of the invention will be obtained from the following description of the preferred embodiments, taken in conjunction with the attached drawings.

DESCRIPTION OF THE DRAWINGS

In FIG. 3 only a small segment of the packing is shown to show more details of the arrangement of the bubble tray that is used in the glycol stripper.

DETAILED DESCRIPTION OF THE PREFERRED EMBODIMENTS

Figure 1:
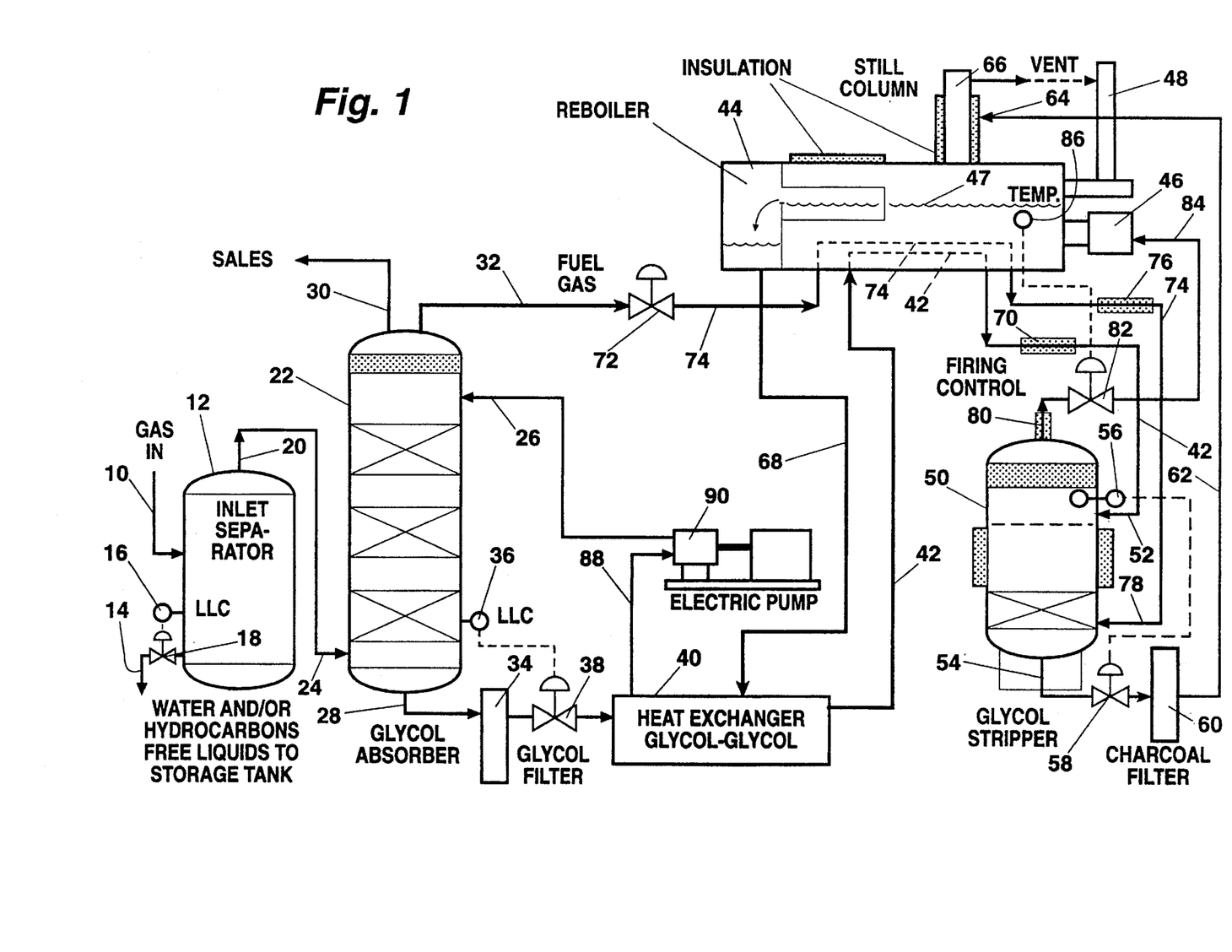
FIG. 1 is a schematic flow sheet showing an apparatus arranged for use in practicing the method of this invention.

Referring first to FIG. 1, the schematic flow sheet showing the apparatus used in the method of dehydrating natural gas for reducing emissions of hydrocarbon impurities is shown. Natural gas, such as gas from a well head or group of gas wells, is received in conduit 10 that connects to inlet separator 12. The function of inlet separator 12 is to provide an opportunity for entrained droplets of water, hydrocarbon droplets, sand, rust or other physical impurities to fall out of the gas stream. Basically, inlet separator 12 provides an area wherein the flow rate is decreased because of the size of the vessel and wherein flow direction changes are caused to occur to augment the physical separation of entrained liquid droplets and solids in the gas stream. The liquid that drops out of the gas stream in separator 12, together with any solids, is collected and discharged through conduit 14 to a storage area for proper disposition. By means of a liquid level control 16 that operates valve 18 in conduit 14, the liquid contents of the separator may be controlled. By maintaining a preselected minimum level of fluid within the separator, the possibility of gas flowing from inlet 10 to outlet conduit 14 is prevented. Gas flows out of separator 12 through outlet 20 and into the lower portion of a glycol absorber 22.

It is well known in the petroleum industry that water vapor and, to a lesser extent, entrained hydrocarbon aromatics can be extracted from a natural gas by subjecting the natural gas to a desiccant. Desiccants are typically diethylene glycol, triethylene glycol or mixtures of these or sometimes diglycol amine. Regardless of the specific type of glycol employed in the typical absorber used for drying natural gas, the absorber is generically referred to as a "glycol absorber".

Absorber 22 is an apparatus that provides the environment wherein upwardly flowing gas intimately contacts downwardly migrating liquid desiccant. The techniques for employing glycol absorbers is described in detail in U.S. Pat. Nos. 5,116,393; 4,375,977 and 4,661,130. Basically, gas enters absorber 22 at gas inlet 24 adjacent the lower end of the absorber and flows upwardly, contacting downwardly migrating glycol that has been discharged into the top of the vessel through glycol inlet 26. The glycol flows out of the lower portion of absorber 22 at glycol outlet 28. At outlet 28, the glycol contains absorbed water along with some hydrocarbon aromatics and is termed "spent glycol".

Gas that has moved upwardly through absorber 22 is substantially free of entrained water and hydrocarbon aromatics. In the illustrated arrangement, most of the gas passes out of the absorber through outlet 30 where it is essentially ready to be used, and, thus, a major portion of the gas passing out of absorber 22 is passed to "sales". Another portion of the gas passing out of absorber 22 through outlet 32 is used in the process in this invention for two purposes as will be described subsequently.

The spent glycol at outlet 28 is passed through filter 34 to remove any entrained solid components, such as sand, dirt, rust, etc. Spent glycol is dumped out of absorber 22 in response to a liquid level controller 36 that controls valve 38 to thereby maintain a minimum level of spent glycol in the bottom of absorber 22 at all times. The spent glycol flowing through valve 38 passes through a heat exchanger 40 into a conduit 42. In the usual arrangement known in the industry, the spent glycol passing from valve 38 is conducted directly to a reboiler where heat is applied to the glycol to boil off entrained water, after which the glycol is directed back to glycol inlet 26. A problem exists, however, in that boiling off water from the glycol also boils off entrained hydrocarbon aromatics that are discharged to the atmosphere. Such aromatics include benzene, toluene, ethylene, and xylene (frequently referred to as BTEX products). These products are considered carcinogenic. An object of this disclosure is to provide a method of glycol dehydration of natural gas which substantially reduces any discharge of BTEX type aromatics into the atmosphere.

The system employs the usual reboiler 44 that is supplied by heat from burner 46 so that spent glycol within the reboiler is subjected to heat sufficient to vaporize water entrained in the glycol, but the temperature is not raised high enough to vaporize the glycol. The level of glycol within reboiler 44 is indicated by numeral 47. Water vapor together with any other products that are boiled out of the glycol in reboiler 44 are vented to the atmosphere through vent 48.

The method of this disclosure reduces the amount of aromatics discharged to the atmosphere by the employment of a glycol stripper vessel 50.

Spent glycol enters stripper vessel 50 at glycol inlet 52, the glycol passing out of the bottom of the vessel at glycol outlet 54. By means of level control 56 that operates a valve 58, the level of glycol within the stripper is controlled.

Glycol passing out of the stripper vessel through valve 58 flows through an optional charcoal filter 60 where solid contaminants are removed. A charcoal filter also functions to absorb some hydrocarbon aromatics that might be retained in the glycol, however the use of a charcoal filter is not mandatory. From filter 60, conduit 62 delivers the glycol to a glycol inlet 64 where it passes into the interior of reboiler 44. Specifically, glycol inlet 64 is in still column 66, the glycol flowing from the still column jacket into the interior of reboiler 44.

The function of glycol stripper vessel 50 is to augment the removal of hydrocarbon aromatics. The glycol in stripper vessel is at the glycol regeneration temperature, that is, substantially the same temperature is maintained as the necessary temperature for processing in reboiler 44. Maintaining the temperature of the glycol in stripper 50 is achieved in two ways. First, as previously indicated, the glycol passing from absorber 22 passes through heat exchanger 40 where it exchanges heat with heated glycol flowing out of reboiler 44 through conduit 68. Second, conduit 42 that conveys glycol from absorber 22 to stripper 50 passes within the interior of reboiler 44, as indicated by the dotted portion of conduit 42. Conduit 42 after leaving reboiler 44 is provided with insulation 70 so that the temperature of the glycol flowing from conduit 42 into glycol inlet 52 of the stripper is substantially identical to that within the reboiler, that is, the temperature of the glycol is at the regeneration temperature.

As previously mentioned, a portion of the gas passing out of absorber 22 passes out through second conduit 32. This gas passes through a pressure regulator 72 in a conduit 74. The function of regulator 72 is to keep glycol stripper 50 at the correct pressure.

Conduit 74 passes through the interior of reboiler 44, as indicated by the dashed line portion. Conduit 74 after leaving reboiler 44 is provided with insulation 76 so that the gas is delivered at gas inlet 78 substantially at glycol regeneration temperature, that is, the temperature of the glycol in reboiler 44. The gas flows upwardly from inlet 78 through the gas outlet 80 in the top of stripper vessel 50. The gas flows through a control valve 82 in conduit 84 to burner 46. A temperature control 86 regulates valve 82 to deliver the required quantity of gas to burner 46 to maintain the temperature of the glycol within reboiler 44 at the glycol regeneration temperature.

Figure 2:
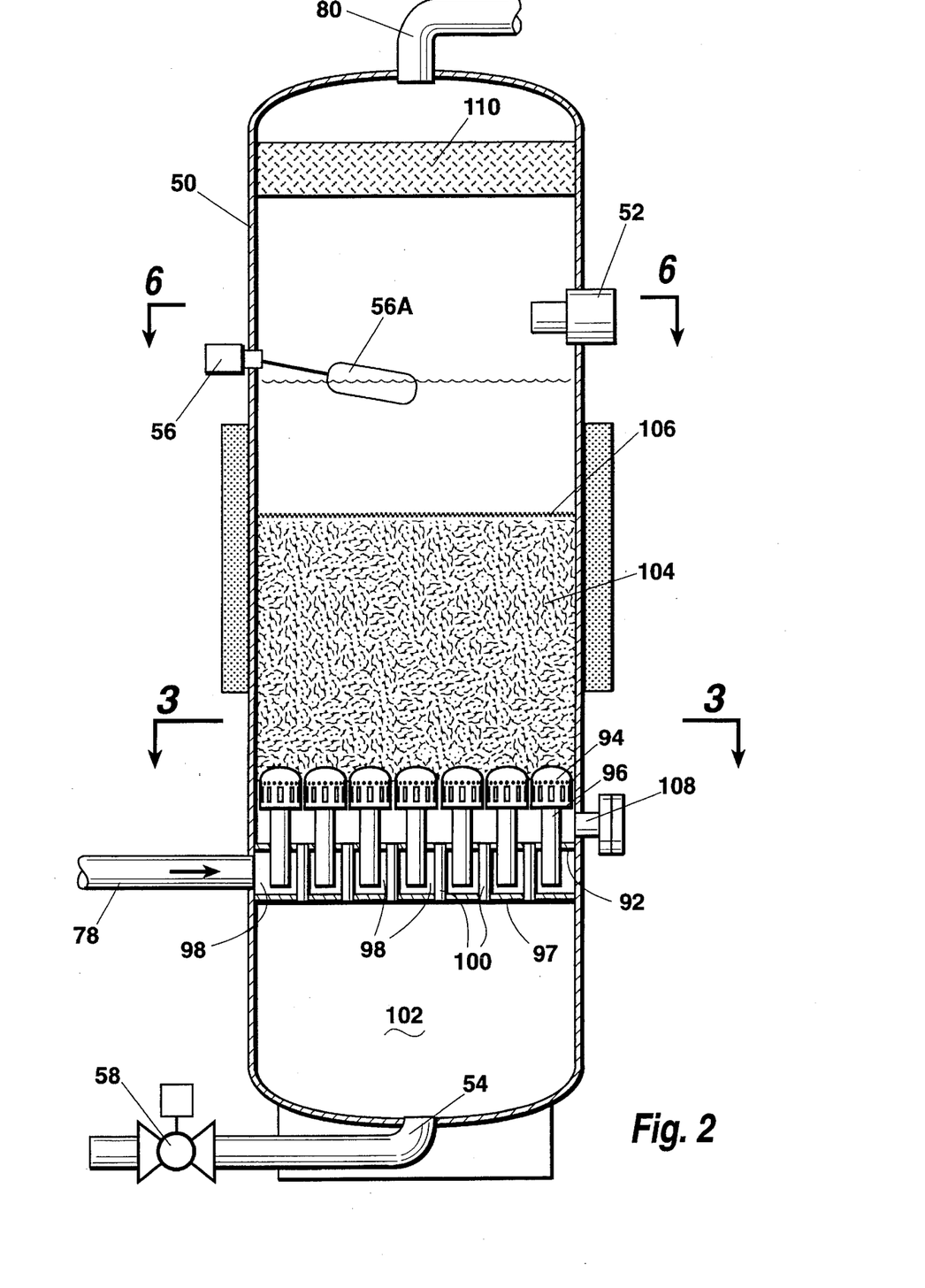
FIG. 2 is an elevational cross-sectional view of one embodiment of a glycol stripper as used in the system of FIG. 1.
Figure 3:
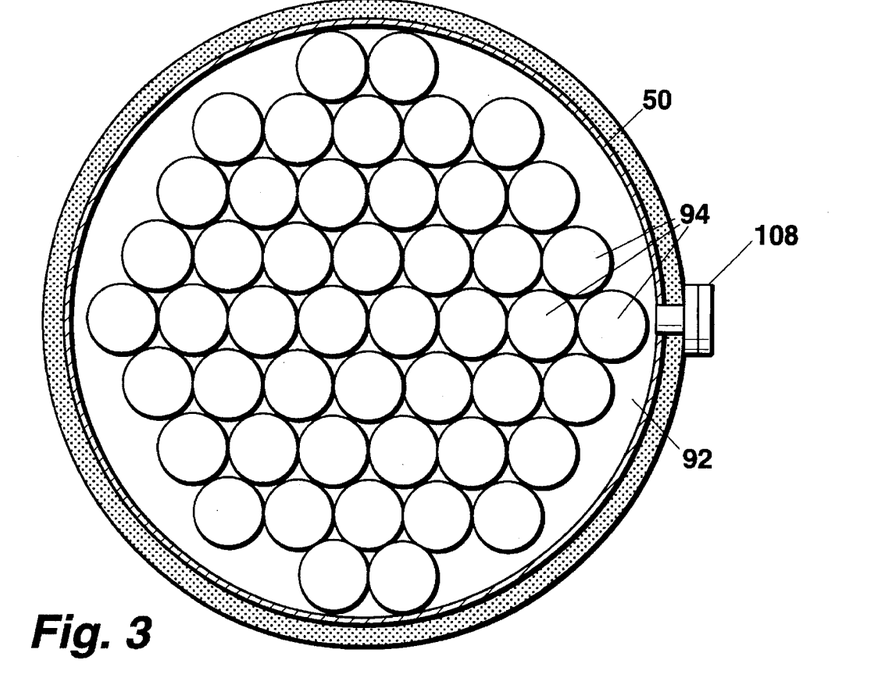
FIG. 3 is a cross-sectional horizontal view of the glycol stripper taken along the line 3—3 of FIG. 2.
Figure 5:
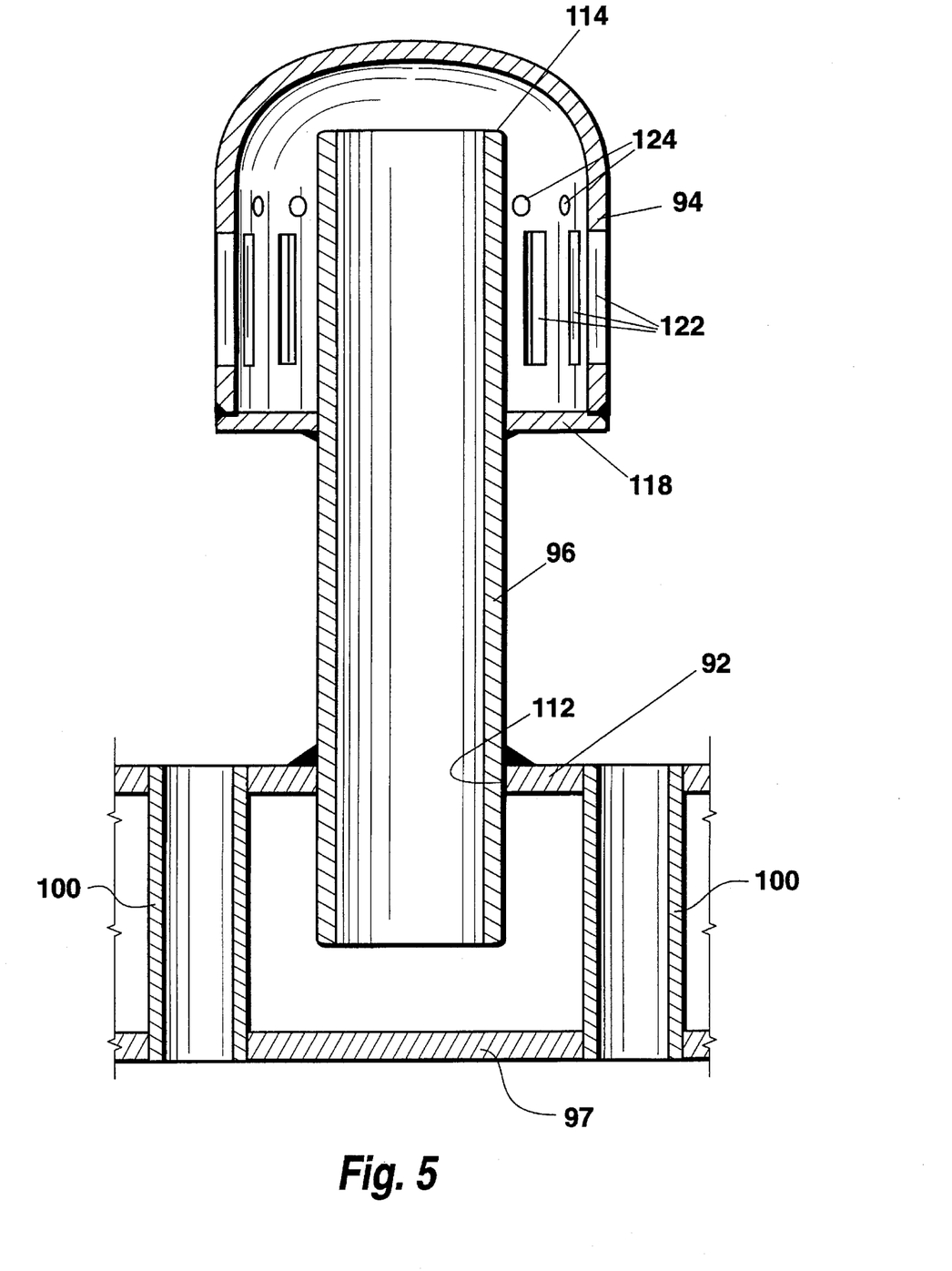
FIG. 5 is an elevational cross-sectional view of a bubble cap supported on a bubble cap tray taken along the line 5—5 of FIG. 4.

Insulation is shown on glycol stripper 50 in FIGS. 2, 3 and 5 to illustrate that effectiveness and efficiency of the dehydrating method is improved by preserving the temperature of the liquid and gas flowing into and out of this vessel. The insulation also helps prevent condensation occurring within the lines.

The function of stripper 50 is to pass stripper gas up through the spent glycol after the glycol has been utilized in absorber 22 and before it is delivered to reboiler 44. The stripper gas serves to augment the extraction of substantially all of any entrained hydrocarbon aromatics from the glycol. These aromatics are carried by the stripper gas into burner 46 where they are combusted.

Vapors that are boiled off of the stripped glycol in reboiler 44 and passed to the atmosphere through vent 48 are substantially free of hydrocarbon aromatics.

Glycol, after being regenerated in the reboiler, that is, after being released of entrained water, passes out of the reboiler through conduit 68 and into heat exchanger 40 for purposes previously described. This regenerated glycol from conduit 68 flows out of heat exchanger 40 through conduit 88 and is moved by an electrically driven pump 90 to glycol inlet 26 of the absorber. Thus, the glycol is recirculated and reused. In the method of this invention, unlike the typical system, the glycol is treated in stripper 50 at an elevated temperature to substantially eliminate the possibility of any significant hydrocarbon aromatics being passed out of reboiler vent 48 to the atmosphere.

FIG. 2 shows an elevational cross-sectional view of the glycol stripper 50. The vessel 50 is provided with a bubble tray 92 that supports a plurality of bubble caps 94 each of which is on a riser tube 96. A separator plate 97 is spaced below and parallel to tray 92 creating gas inlet area 98. Gas inlet pipe 78 connects with gas inlet area 98. The lower end of each of the bubble cap riser tubes 96 also communicate with area 98 so that gas flowing into stripper vessel 50 from inlet pipe 78 flows into area 98, through riser tubes 96 and bubble caps 94 into the interior of the stripper vessel.

A plurality of drain tubes 100 extend through bubble tray 92 and separator plate 97 into a collection zone 102.

Figure 4:
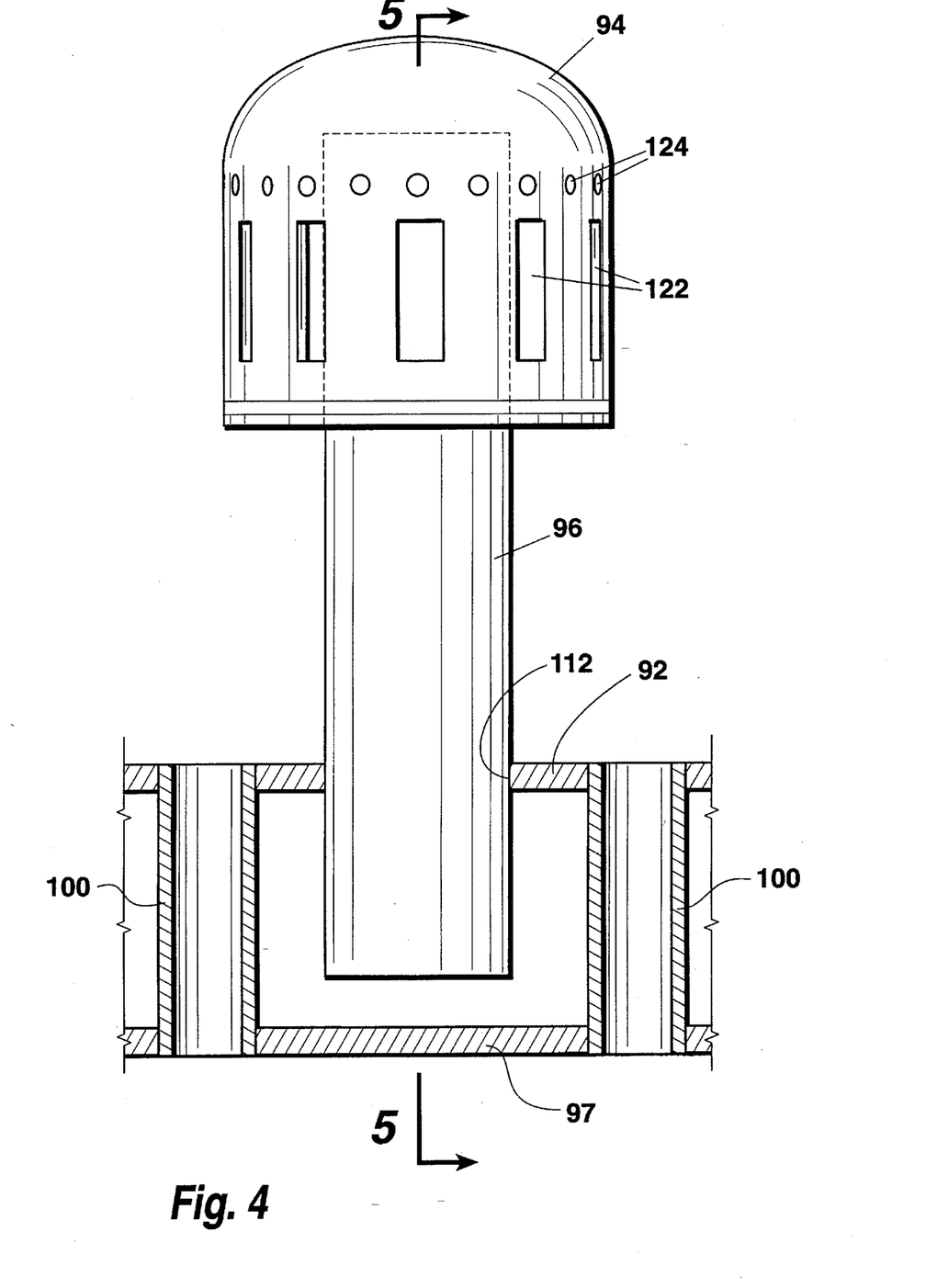
FIG. 4 is an elevational view showing one method of bubble caps on a bubble tray as may be employed in the glycol stripper. One or more of the bubble trays having the bubble caps of FIG. 4 can also be employed in the glycol absorber.

FIGS. 4 and 5 show more details of the bubble tray 92, separator plate 97, area 98 between the tray and the plate, the bubble cap riser tubes 96, drain tubes 100 and bubble caps 94 as employed in glycol stripper vessel 50.

FIG. 3 shows that there are a large number of bubble caps 94 positioned on tray 92. FIG. 3 does not show packing 104 that is seen in FIG. 2 so as to reveal the bubble caps.

Referring back to FIG. 2, screen 106 is positioned on top of packing 104, the function of the screen being to distribute glycol over the packing so that it flows downwardly through the vessel. Glycol enters stripper 50 through inlet 52, the level of glycol being maintained by level control 56. The glycol migrates downwardly through packing 104 where it encounters upwardly flowing gas. As previously stated, the glycol flows through drain tubes 100 into the lower portion 102 of the vessel and is removed through glycol outlet 54.

A bubble tray clean out 108 is provided. The clean out is not employed in the flow of gases and fluids in the method of this disclosure but is used only for purposes of washing out bubble tray 92 below bubble caps 94 which can be done periodically to eliminate the accumulation of debris.

Gas flows upwardly from bubble caps 94 through packing 104 and screen 106. The gas picks up out of the glycol flowing downwardly through the vessel entrained hydrocarbon aromatics. The gas flows through a demister 110 and into gas outlet 80 where it is passed to the burner 46 as shown in FIG. 1.

The effective operation of glycol stripper 50 depends to a great extent upon efficient contact of the glycol with upwardly flowing gas. As shown in FIGS. 4 and 5, bubble tray 92 has an opening 112 for each upwardly extending tube 96. Affixed to each tube 96 above tray 92 and below the upper end 114 of the tube, is a washer 118. Secured to washer 118 is a bubble cap 94 that has a plurality of slot openings 122. Openings 122 are narrow and spaced apart to cause the formation of very small gas bubbles. Supplementary circular openings 124 may be employed in addition to the slot openings 122.

Figure 6:
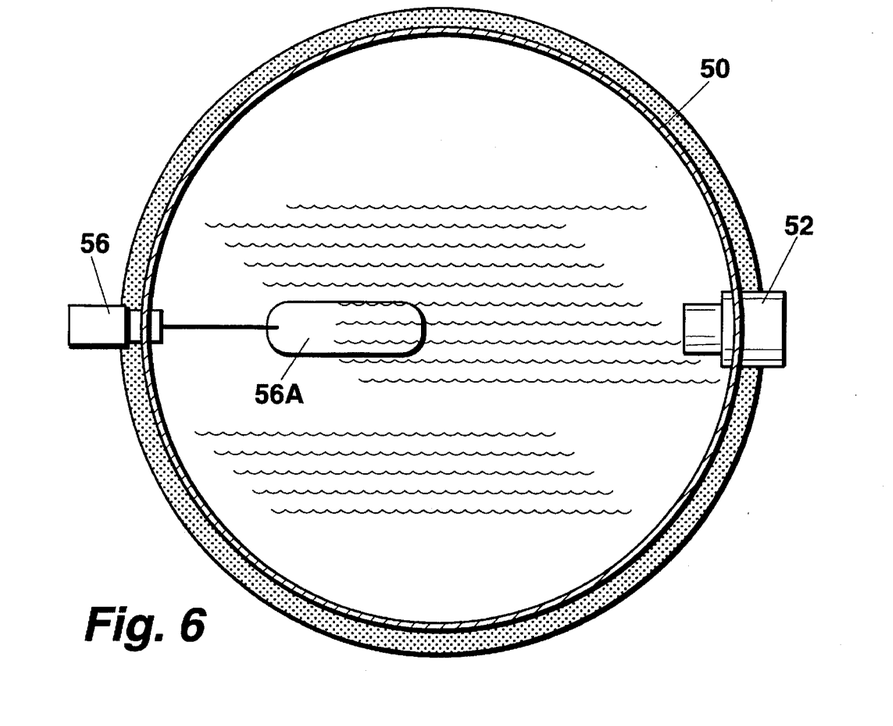
FIG. 6 is an elevational cross-sectional view of the glycol stripper as taken along the line 6—6 of FIG. 2 showing more details of the construction of this vessel as used in practicing the method of this invention.

FIG. 6 is a horizontal cross-sectional view of the stripper vessel as taken along the line 6—6 of FIG. 2 and shows level control 56 which may incorporate, as a part thereof, a float 56A by which the level of glycol within the stripper vessel is maintained.

The method of dehydrating natural gas to control environmental emissions from a glycol dehydration unit as illustrated and described herein provides an efficient system for substantially decreasing the amount of hydrocarbon aromatics that otherwise is discharged to the atmosphere. Further, the system of this invention is energy efficient in that the temperature of the glycol and gas within glycol stripper 50 is supplied by heat energy available from reboiler 44. Stripper vessel 50 does not require a separate heater, thus, substantially reducing the number of controls required by the system.

Figure 7:
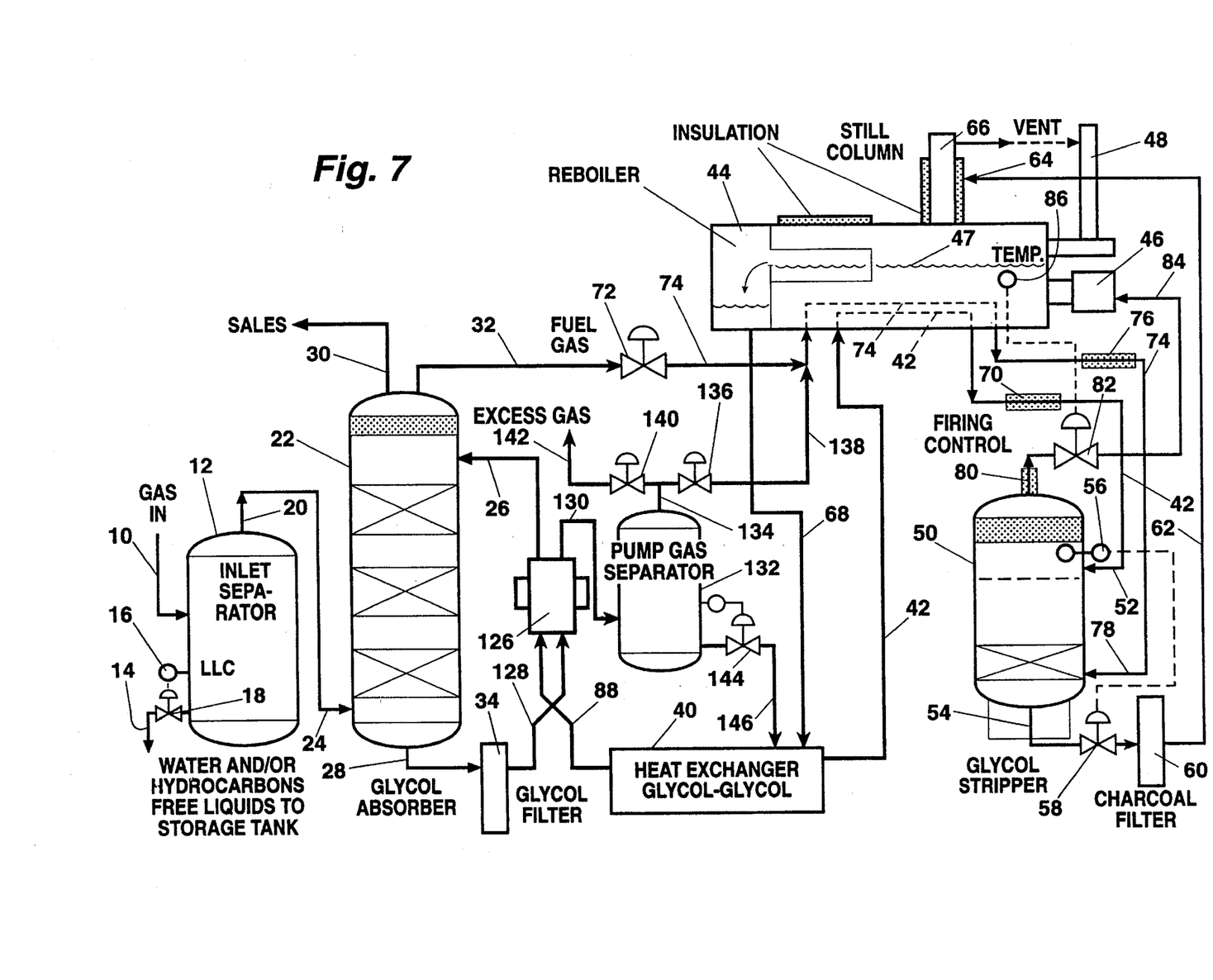
FIG. 7 is a schematic flow sheet very similar to the flow sheet of FIG. 1 except that in FIG. 1 the method employs an electrically powered pump for recirculating the liquid desiccant, whereas in FIG. 7 the liquid desiccant is recirculated by means of a glycol/gas powered pump, it illustrates the application of the method of the invention in locations where electrical energy is not economically available.

FIG. 1 illustrates a schematic flow sheet showing an apparatus arranged for use in practicing the method of this invention wherein the liquid desiccant is recirculated by means of an electric motor driven pump 90. This is the preferred arrangement when electrical energy is conveniently and economically available. In some locations where it is necessary to dehydrate natural gas, electrical energy is not available or, at least, is not available on economic terms. Some oil producing locations are so remote from available electrical power transmission lines that to bring electrical power to a gas dehydrating facility requires stringing a new power line, which expense can not often be justified. FIG. 7 is a schematic flow sheet showing substantially the identical arrangement of an apparatus for practicing the method of this invention, but showing how the system can function without the use of electrical power for recirculating the liquid desiccant.

In the embodiment of FIG. 7, the method employs a glycol/gas powered pump 126. Glycol/gas powered pumps are commercially available and are frequently utilized in gas dehydration facilities for recirculating liquid desiccant (usually glycol and thus the term "glycol/gas powered pump") where electrical energy is not available. Glycol and/or gas, or a combination of the two, flowing through pump 126 provides energy for recirculating the liquid desiccant. Conduit 88 passing from heat exchanger 40 connects with the glycol/gas powered pump 126. As the pump operates, liquid desiccant is moved from conduit 88 to glycol inlet conduit 26 by pump 126 to recirculate glycol from heat exchanger 40 back into glycol absorber 22. Thus, the flow of desiccant is as follows: regenerated desiccant from reboiler 44 flows through conduit 68, through heat exchanger 40, through conduit 88, through glycol/gas powered pump 126, and through conduit 26 into the inlet of absorber 22. To obtain energy to power glycol gas/powered pump, the glycol outlet 28 from absorber 22, after passing through filter 34, flows by conduit 128 to glycol/gas powered pump 126. The flow of spent glycol from absorber 22 flows under pressure provided by the inlet gas flowing into absorber 22. Pressure drop occurs within glycol/gas powered pump 126 to provide the energy to move the regenerated glycol as previously described. The glycol passes from conduit 128 through pump 126 to conduit 130 where it flows into a pump gas separator 132. Within the separator any entrained gas in the glycol stream is separated off, the gas being drawn from the pump gas separator through gas outlet 134. Gas from outlet 134 flows through a pressure regulator 136 and conduit 138 where it connects with conduit 74. The combined conduits forming conduit 74 pass within reboiler 44 wherein the gas is heated and conveyed to gas stripper 50, all as previously described. If excess gas is separated out by the pump gas separator 132, that is, gas in excess of that which is required by burner 46, it passes through a pressure regulator 140 to conduit 142 as excess gas. This excess gas can be utilized if needed, but the most expedient means is to flare the excess gas from conduit 142.

The liquid desiccant passing from conduit 130 after having passed through glycol/gas powered pump 126 enters pump gas separator 132 and flows through a level control 144 to a conduit 146 that connects with heat exchanger 40. Conduit 146 is in communication through the heat exchanger with conduit 42, thus, the spent glycol passing out of absorber 22 through conduit 28 passes through filter 34, glycol/gas powered pump 126, pump gas separator 132, level control 144, heat exchanger 40, conduit 42, reboiler 44 and into glycol stripper 50 for purposes as previously described.

It can be seen that the method illustrated in the apparatus of FIG. 7 is substantially identical to the method illustrated in the apparatus of FIG. 1 except for the use of the glycol/gas powered pump and for the use of the pump gas separator to separate out any gas entrained in the glycol passing out of absorber 22. Pump gas separator 132 is employed since the excess gas if passed through glycol stripper 50 would create foaming and turbulence within glycol stripper 50, thus, a portion of the excess gas must be separated out and passed by way of conduit 142 to be flared or for other disposition.

While not shown in FIG. 7, glycol stripper 50 is preferably insulated to preserve the temperature of liquids and gases within the vessel.

Figure 8:
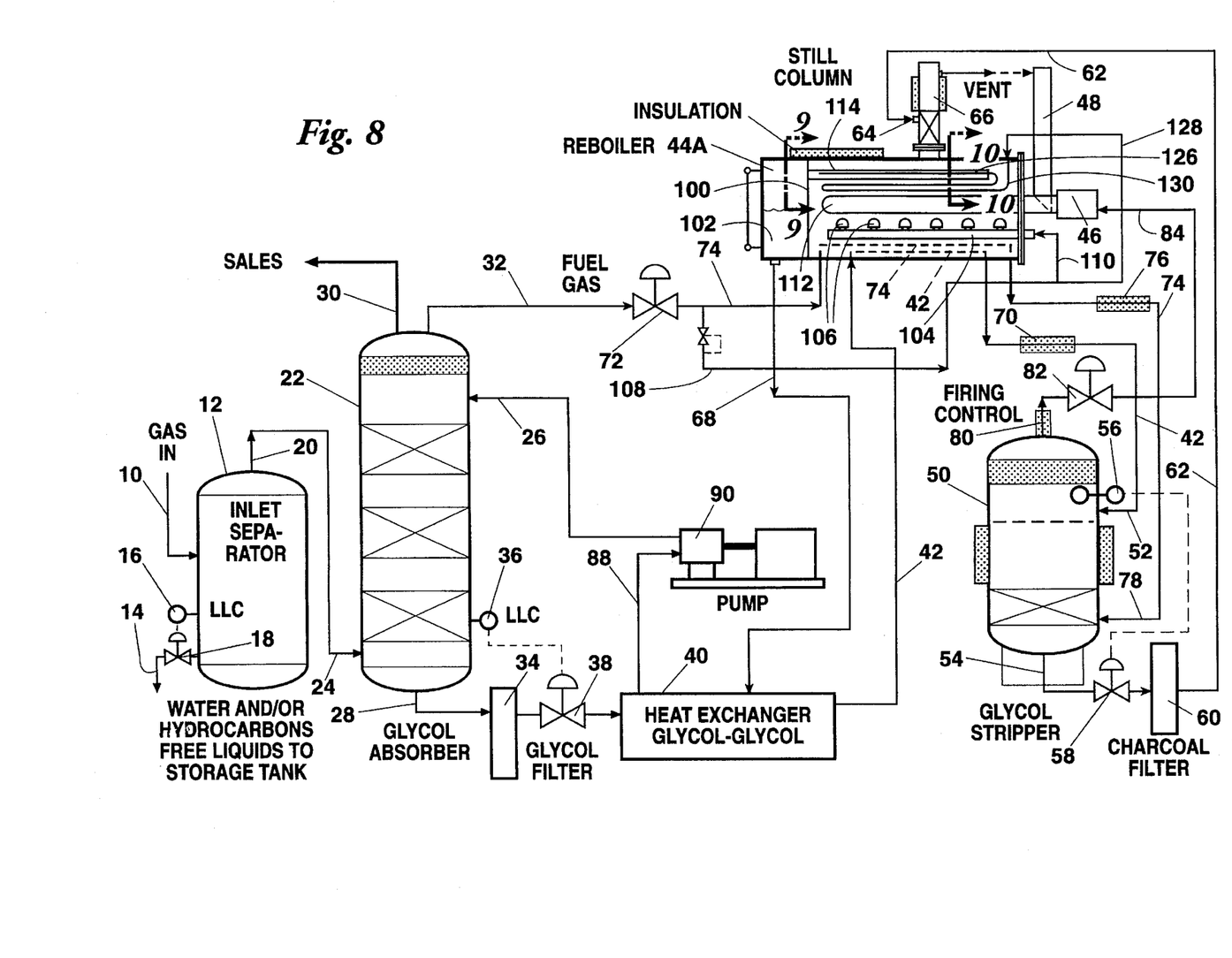
FIG. 8 is a schematic flow diagram showing the system for practicing the invention including the method of low temperature regeneration of glycol used for dehydrating natural gas.
Figure 9:
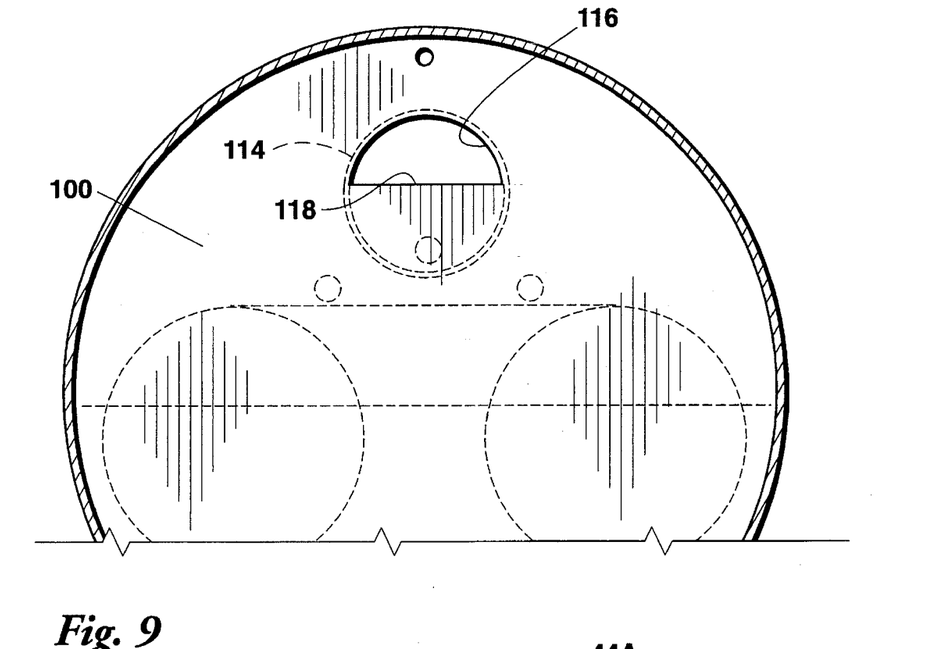
FIG. 9 is a partial cross-sectional view of the reboiler vessel as taken along the line 9—9 of FIG. 8 showing a portion of the interior of the reboiler vessel and showing the overflow weir of the upper gas stripper vessel by which regenerated glycol flows from the main interior of the reboiler into a collection portion of the reboiler vessel for circulation back through an absorber for use in absorbing water from natural gas.
Figure 10:
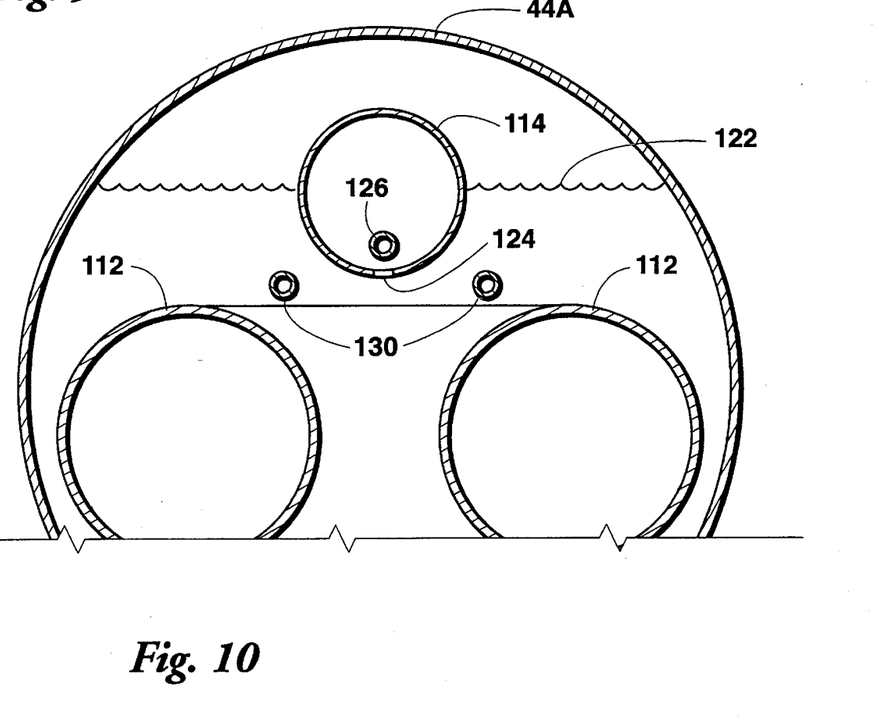
FIG. 10 is a partial cross-sectional view of a different section of the reboiler vessel showing the relationship between the upper gas stripper vessel and the burner tubes and showing the relative position of the gas distribution pipe within the upper gas stripper vessel.

Referring now to FIGS. 8, 9 and 10, a different embodiment of the invention is illustrated which is particularly useful for maintaining the regeneration temperature of the glycol in the reboiler at a low level so as to reduce evaporation and thereby reduce loss of the glycol and to reduce the possibility of the passage of evaporated glycol into the atmosphere. Reboiler 44A has a vertical partition 100 separating the interior into a main portion wherein spent glycol is subjected to heat to drive off entrained water and to provide regenerated glycol for use in recirculation through the system. The regenerated glycol is passed into a collection portion 102 where it flows out by conduit 68 for reuse as has been described with reference to FIG. 7. The reboiler 44A of FIG. 8 is different than the reboiler 44 of the embodiment of FIG. 7 in two main ways. First, as shown in FIG. 8, reboiler 44A includes a primary stripper media distribution system 104 consisting of an elongated tubular member having a plurality of bubble caps 106. The primary distribution system 104 is positioned in the lower portion of reboiler 44A. Dehydrated gas from line 32 is passed by conduits 108 and 110 into the primary distribution system 104. The gas passes into the spent glycol within the reboiler as the gas bubbles out of bubble caps 106. Bubble caps 106 are arranged to create very small bubbles to gently but thoroughly contact the upwardly migrating gas with the glycol and to agitate the spent glycol within reboiler 44A to cause the heated glycol to release entrained water vapor which passes out of the glycol.

Positioned within reboiler 44A is a heater tube 112 which is U-shaped and connects back to burner 46 as part of the heater system.

A second important difference in the reboiler arrangement 44A compared to the system described with reference to FIG. 7, is the provision of an upper gas stripper vessel 114. Upper gas stripper vessel 114 extends horizontally within the upper portion of reboiler 44A above heater tube 112 and, in the illustrated arrangement, is supported by partition 100. Partition 100, as shown in FIG. 9, has a semi-circular opening 116 communicating with the upper gas stripper vessel 114. The semi-circular opening provides a weir 118 through which glycol flows from the interior of the reboiler into collection portion 102. Weir 118 determines the liquid level of the glycol within the main portion of reboiler 44A since upper gas stripper vessel 114 has one or more openings 124 (See FIG. 10) through which glycol flows from the interior of reboiler 44A. FIG. 10 shows the liquid level 122 that is determined by the elevation of weir 118.

FIG. 10 illustrates upper gas stripper vessel 114 having one or more openings 124 in the lower portion thereof. Openings 124 are preferably near the end of upper gas stripper vessel 114 opposite of partition 100. Glycol flowing into the interior of reboiler 44A by way of conduit 62 and inlet 64 ultimately flows from the interior of the main portion of the reboiler through opening 124 within the upper gas stripper vessel 114. The glycol migrates within the upper gas stripper vessel and ultimately passes out over weir 118 into the collection portion 102.

Positioned within the upper gas stripper vessel 114, adjacent the lower interior surface thereof, is a gas discharge conduit 126 (See FIGS. 8 and 10) that has small diameter openings in the lower surface thereof (not seen) to cause small bubbles to pass upwardly through glycol contained within upper gas stripper vessel 114. This provides a final gentle but thorough agitation of the heated glycol to cause any entrained water vapors to pass out of the glycol so that the glycol is regenerated for further use.

FIG. 8 shows a conduit 128 that connects with conduit 108 to carry dehydrated gas. Conduit 128 connects with an interior conduit 130 within the reboiler vessel. Interior conduit 130 loops within the reboiler vessel (see also FIG. 10) before connecting with conduit 126. The purpose of loop conduit 130 is to subject the gas entering the reboiler to the temperature of the heated glycol so that when the gas is discharged out of perforated conduit 126 within upper gas stripper vessel 114, the temperature of the gas will be substantially equal to the temperature of the glycol within the reboiler to make certain that the gas is extremely dry.

Thus, it can be seen that the reboiler of FIGS. 8, 9 and 10 provides for improved separation of water vapor from the spent glycol. The reboiler 44A functions first, to heat the glycol to cause water entrained within the glycol to form steam and to pass out of the glycol liquid. In addition to supplying heat provided by burner 46 and distributed through heater tube 112, the improved reboiler 44A of the system further augments the separation of water by passing dehydrated gas first through a primary distributor system 104 and bubble caps 106 in the lower portion of the reboiler vessel to gently but thoroughly agitate the glycol to cause the water to be converted to steam at lower glycol temperatures and a final separation of water is augmented by the passing of dehydrated gas out through the heated glycol within upper gas stripper vessel 114 immediately before the regenerated glycol is discharged into collection portion 102. The result is that the glycol is thoroughly regenerated, that is, substantially dehydrated without the glycol reaching its boiling temperature to thereby reduce the loss of glycol in the system and to prevent evaporated glycol from passing into the environment.

The purpose of reheating the gas thoroughly within the reboiler is to increase its capacity to strip water from the glycol within the glycol stripper. The glycol in glycol stripper 50 has been heated to its temperature of 100% water saturation. Thus, the very, dry dehydrated and superheated gas passing from line 78 into glycol stripper 50 has a great capacity to take the water from the 100% saturated glycol.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of low temperature regeneration of glycol used for dehydrating natural gas, comprising:

(1) passing said natural gas against flowing glycol in an absorber vessel so that the glycol absorbs water from the gas providing spent glycol and dehydrated gas;

(2) withdrawing said spent glycol and said dehydrated gas from said absorber vessel;

(3) conducting spent glycol from step (2) into a reboiler vessel;

(4) feeding a portion of said dehydrated gas from step (2) into a burner positioned within said reboiler vessel where said dehydrated gas is combusted in said burner to heat said spent glycol;

(5) conducting a first portion of said dehydrated gas from step (2) into a gas distributor located within a lower portion of said reboiler, the gas distributor causing small bubbles of gas to move upwardly through said spent glycol within said reboiler to augment the separation of water from the spent glycol at temperatures lower than the boiling point of the glycol to provide regenerated glycol;

(6) conducting a second portion of said dehydrated gas from step (2) into an upper gas stripper vessel mounted within the upper portion of said reboiler vessel to contact said dehydrated gas from step (2) with said spent glycol to further augment the separation of water from the spent glycol; and (7) withdrawing regenerated glycol from said reboiler obtained in step (5) and returning the withdrawn regenerated glycol to said absorber vessel.

2. The method of dehydrating natural gas according to claim 1 wherein steps 5 and 6 of conducting a first portion of said dehydrated gas from step (2) into a first gas distributor located in a lower portion of said reboiler and conducting a second portion of said dehydrated gas into said upper portion of said reboiler causing bubbles within said upper gas stripper vessel to augment separation of water from the spent glycol to provide regenerated glycol, steps (5) and (6) taking place below glycol boiling point temperatures.

3. The method of dehydrating natural gas according to claim 1 wherein said natural gas includes hydrocarbon components aromatics and BTX compounds and wherein between steps (2) and (3) said spent glycol is passed downwardly through an intermediate stripper vessel to contact a portion of said dehydrated gas to purge said spent glycol of said hydrocarbon components aromatics and BTEX compounds to provide a purged spent glycol that is conducted into said reboiler vessel.

4. A method of dehydrating natural gas according to claim 3 including heating a portion of said dehydrated gas before it is passed into said upper gas stripper vessel.

5. A method of dehydrating natural gas according to claim 4 wherein said portion of said dehydrated gas is passed in heat exchange relationship with said glycol in said reboiler before said treated gas is passed to said upper gas stripper vessel.

6. A method of dehydrating natural gas according to claim 1 wherein said glycol is a diethylene glycol.

7. A method of dehydrating natural gas according to claim 1 wherein step (3) includes raising the temperature of said spent glycol by, at least in part, passing said spent glycol into heat exchange relationship with said glycol in said reboiler.

8. A method of dehydrating natural gas according to claim 1 wherein said regenerated glycol of step (7) is fed back to said absorber by recirculating said glycol with a pump.

* * * * *